June 12, 1951        E. M. SPLAINE        2,556,379
SEMIRIMLESS OPHTHALMIC MOUNTING
Filed Feb. 15, 1946        5 Sheets—Sheet 1
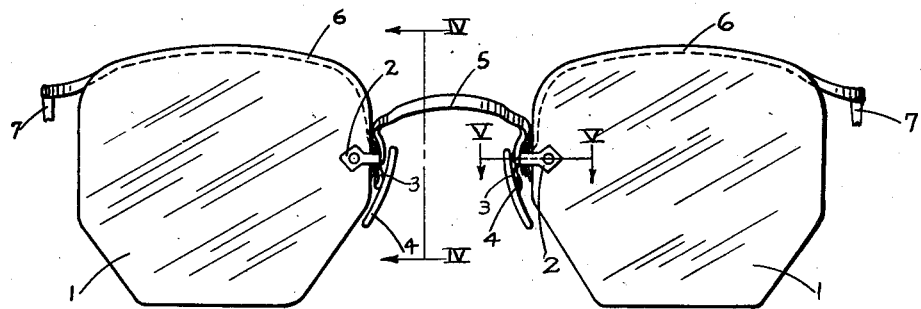
Fig. I
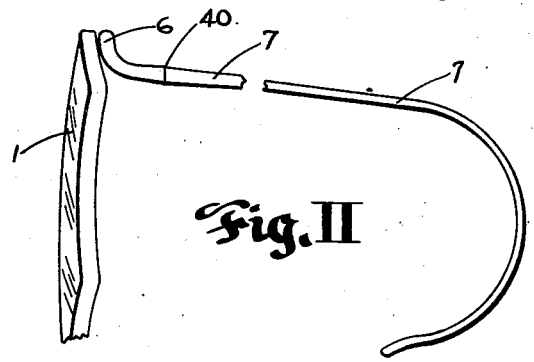
Fig. II
Fig. III
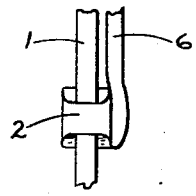
Fig. VI
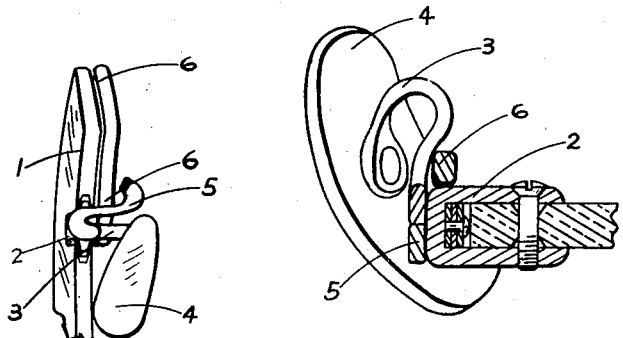
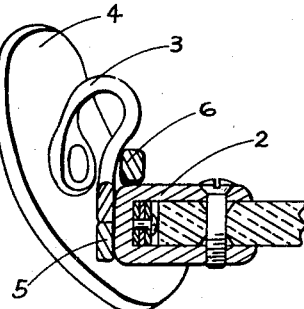
Fig. IV        Fig. V
INVENTOR
EDWARD M. SPLAINE
BY
Louis L. Gagnon
ATTORNEY

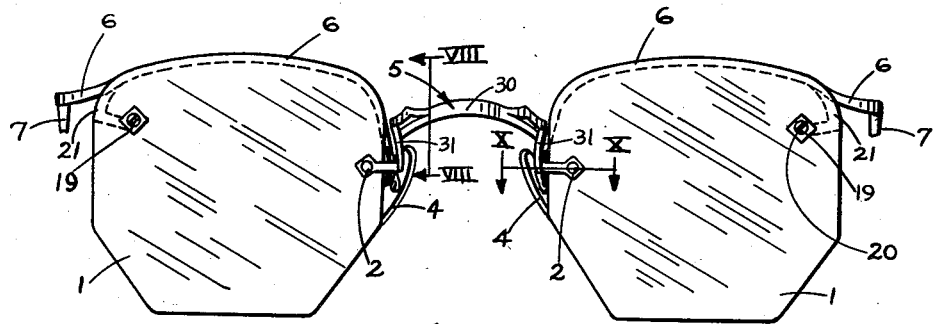
Fig. VII
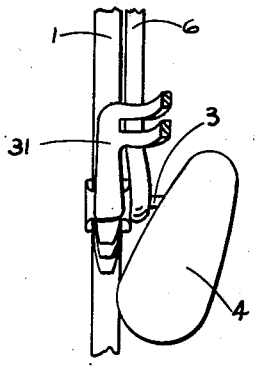
Fig. VIII
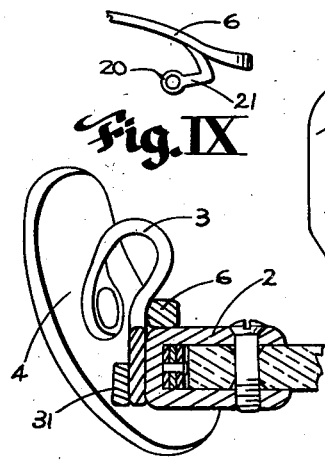
Fig. X
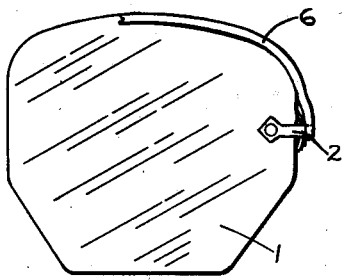
Fig. IX
Fig. XI
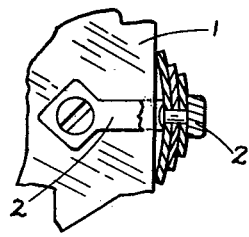
Fig. XII
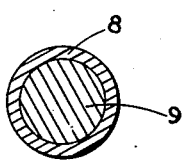
Fig. XIII
*INVENTOR*
EDWARD M. SPLAINE
BY
*Louis L. Gagnon*
*ATTORNEY*

June 12, 1951  E. M. SPLAINE  2,556,379
SEMIRIMLESS OPHTHALMIC MOUNTING
Filed Feb. 15, 1946  5 Sheets-Sheet 3
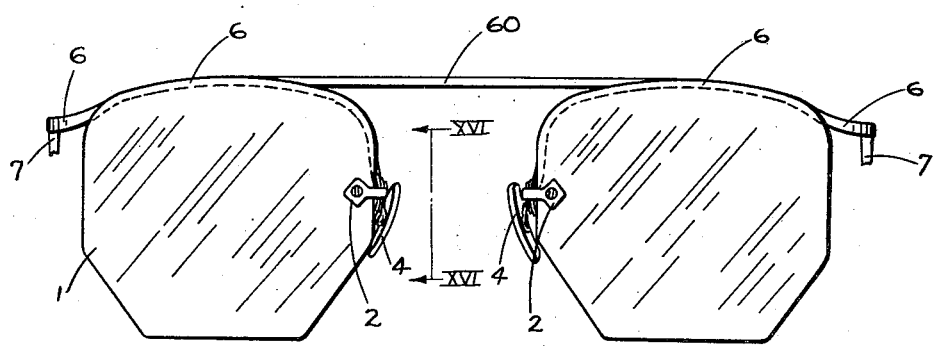
Fig. XIV
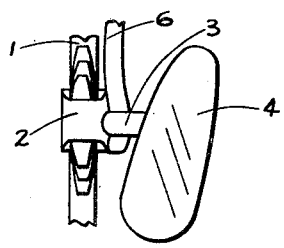
Fig. XVI
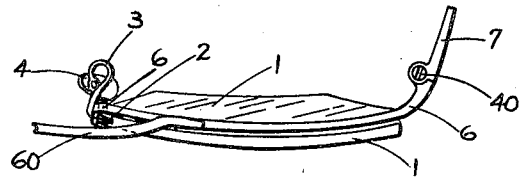
Fig. XV
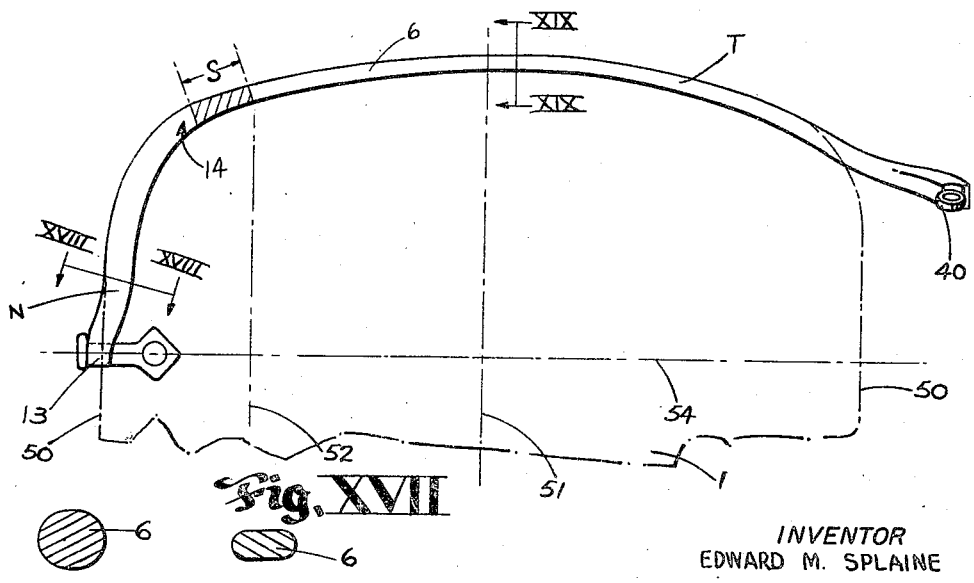
Fig. XVII  Fig. XVIII  Fig. XIX
INVENTOR
EDWARD M. SPLAINE
BY
*Louis L. Gagnon*
ATTORNEY

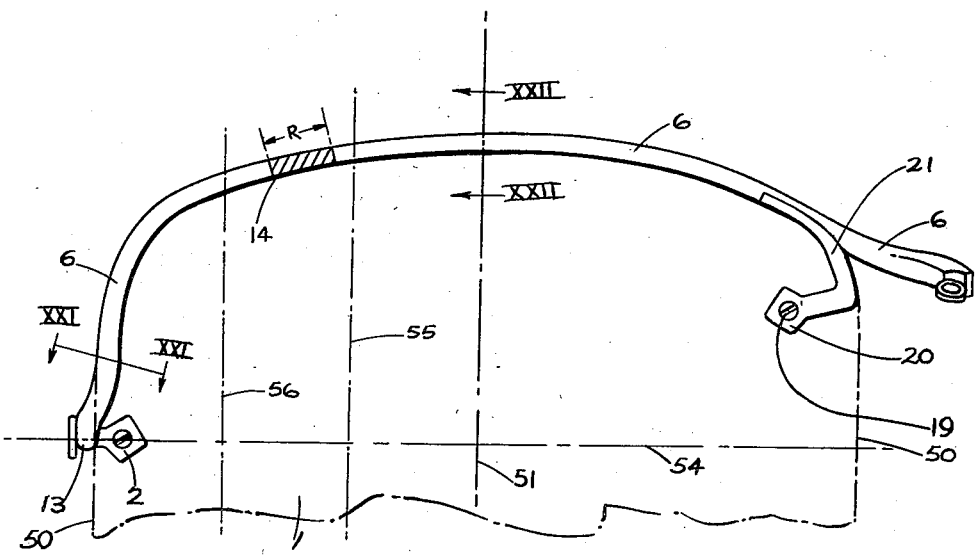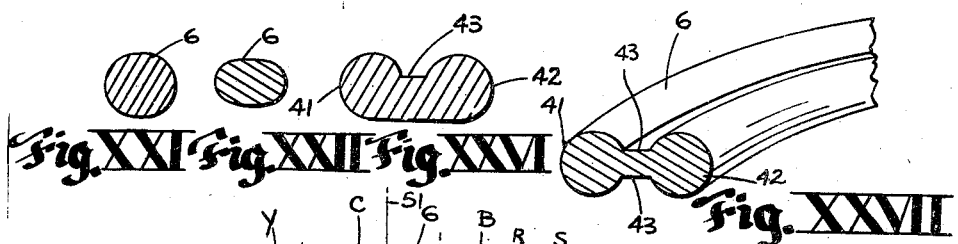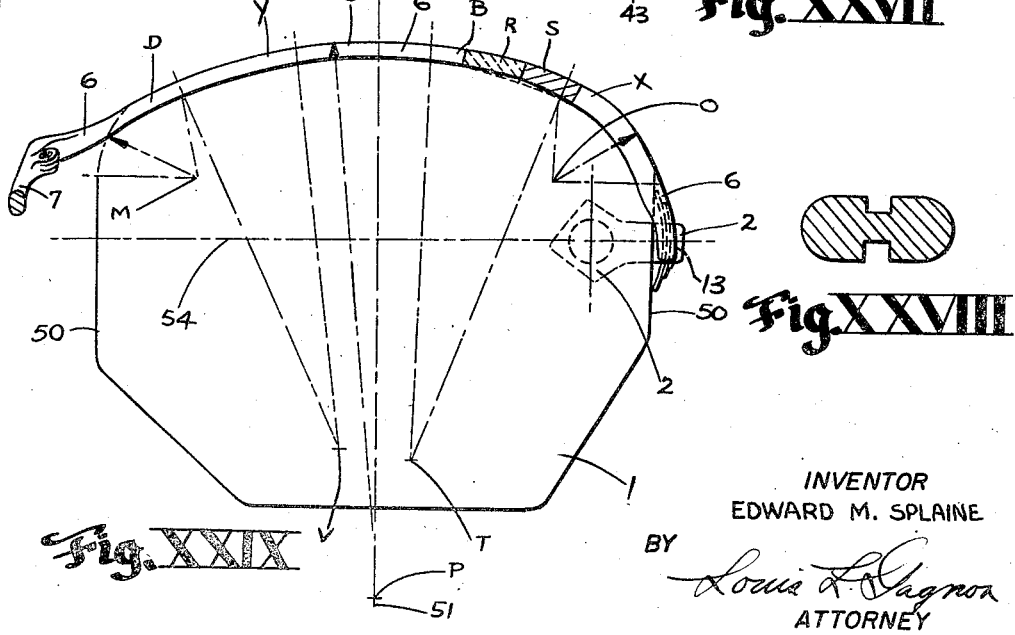

June 12, 1951  E. M. SPLAINE  2,556,379
SEMIRIMLESS OPHTHALMIC MOUNTING
Filed Feb. 15, 1946  5 Sheets-Sheet 5
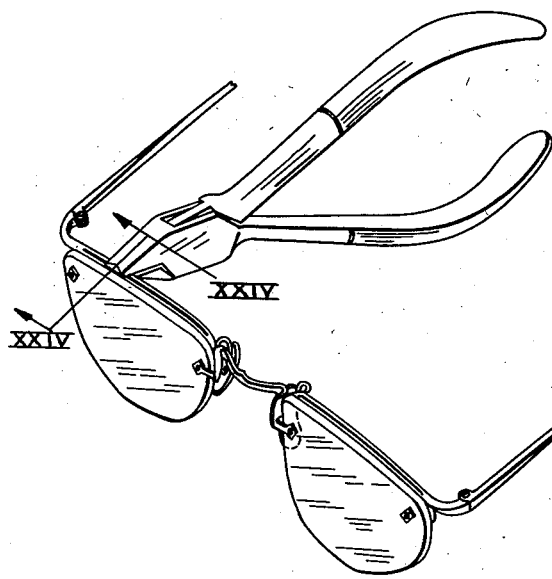
Fig. XXIII
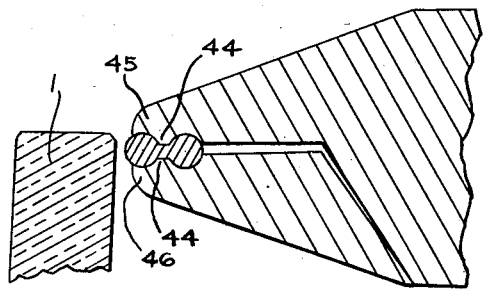
Fig. XXIV
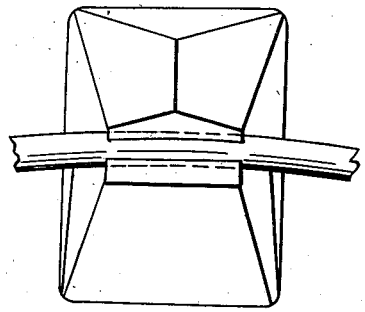
Fig. XXV
INVENTOR
EDWARD M. SPLAINE
BY
Louis L. Gagnon
ATTORNEY Patented June 12, 1951

2,556,379

UNITED STATES PATENT OFFICE 2,556,379

SEMIRIMLESS OPHTHALMIC MOUNTING

Edward M. Splaine, Southbridge, Mass., assignor to American Optical Company, Southbridge, Mass., a voluntary association of Massachusetts Application February 15, 1946, Serial No. 647,667

6 Claims. (Cl. 88—41)

This invention relates to improvements in spectacles or ophthalmic mountings and has particular reference to mountings of the semi-rimless type and to improved methods and processes for making the same.

A principal object of the invention is to provide improved rim or arm members for a semi-rimless type spectacle or ophthalmic mounting that will hold and maintain their alignment with the tops of the lenses, that will return to said aligned position if accidentally displaced therefrom, that will be sufficiently stiff to maintain said alignment and yet permit shaping to the tops of the lenses, that will be stiff and rigid enough to resist displacement from said alignment transversely to the length of said rims and that will be highly resistant to corrosion.

Another object of the invention is to provide improved processes of making the said rim or arm members, both as to the material of the rims or arms and the working or processing of the same to provide the required stiffness and temper in the said rims or arms to maintain the alignment thereof with the lenses and yet provide sufficient flexibility or springiness to cause the rims or arms to return to said aligned position if accidentally displaced therefrom and to allow the working and shaping of the rims or arms to required alignment with the lenses and which will have a high resistance to corrosion.

Another object is to provide rim or arm members for a semi-rimless type spectacle or ophthalmic mounting of such material, form and shape as to maintain their alignment with the lenses and cause them to return to aligned positions if accidentally displaced therefrom, and which will have a high resistance to deterioration by corrosion.

Another object is to provide improved material for the rim or arm members of a semi-rimless type spectacle or ophthalmic mounting and improved process of working the said material to form the rims or arms with required stiffness, temper, freedom from deterioration by corrosion, and flexibility to maintain their alignment with the lenses and to cause them to return to aligned positions if accidentally displaced therefrom.

Another object is to provide simple, efficient, economical, and practical means for making a semi-rimless spectacle or ophthalmic mounting that will overcome the displacement of the rims or arms from aligned position with the lenses which are highly resistant to deterioration by corrosion which have been great defects in this form of spectacle or mounting.

Another object is to provide improved lens rims or arms with means insuring a firm grip of pliers on the rims or arms when the said rims or arms are adjusted to required positions by bending with pliers and to prevent slipping of the pliers and the flaking or breaking of the lenses during the said adjustments.

Another object is to provide improved lens rims or arms of the character described having a groove or grooves extending longitudinally thereof adapted to receive the jaws of a pair of pliers shaped to fit said groove or grooves and to be employed in bending and adjusting the rims or arms for proper positioning thereof relative to the lenses and to avoid accidental slipping and breaking of the lenses during said adjustment.

Another object is to provide improved lens rims or arms of a form that will substantially equalize the bending or displacing tendency throughout the length thereof.

Other objects and advantages of the invention will become apparent from the following description taken in conjunction with the accompanying drawings. It is apparent that many changes can be made in the details of construction, arrangement of parts and in the steps of the process without departing from the invention as set forth in the accompanying claims. Hence, it is not desired that the invention be limited only to the matters shown and described as the preferred forms have been set forth by way of illustration only.

Referring to the drawings:

Fig. I is a front view of a pair of spectacles embodying the invention;

Figure II is a partial side view of Fig. I showing the temple connection;

Fig. III is a partial top view of Fig. I showing the temple connection;

Fig. IV is a fragmentary sectional view taken on line IV—IV of Fig. I looking in the direction of the arrows and showing the rim, bridge and guard connection;

Fig. V is a fragmentary cross-sectional view taken on line V—V of Fig. I of the lens connection looking in the direction indicated by the arrows and showing the rim, bridge and guard connections;

Fig. VI is a fragmentary view similar to Fig. IV showing the connection of the rim or arm member to the lens strap;

Fig. VII is a front view of another form of spectacle or ophthalmic mounting embodying the invention;

Fig. VIII is a fragmentary sectional view taken on line 8—8 of Fig. VII, looking in the direction indicated by the arrows and showing the rim, guard and bridge connections;

Fig. IX is a fragmentary view showing the temple lens connection of Fig. VII.

Fig. X is a sectional view taken on line X—X of Fig. VII, looking in the direction indicated by the arrows and showing the rim, bridge and guard connections;

Fig. XI is a partial rear elevational view showing the nasal rim connection of Fig. VII;

Fig. XII is a fragmentary elevational view of a modified form of nasal lens connection;

Fig. XIII is a cross-sectional view of an arm or rim made of filled material;

Fig. XIV is a front elevational view of another form of spectacle or ophthalmic mounting embodying the invention;

Fig. XV is a partial top plan view of the mounting illustrated in Fig. XIV;

Fig. XVI is a fragmentary view of Fig. XIV looking in the direction indicated by the arrows XVI—XVI and showing the rim, strap and guard arm connections;

Fig. XVII is a rear elevational view of the rims or arms of Figs. I and/or XVI on an enlarged scale;

Fig. XVIII is a sectional view taken on line XVIII—XVIII and looking in the direction indicated by the arrows;

Fig. XIX is a sectional view taken on line XIX—XIX and looking in the direction indicated by the arrows;

Fig. XX is a rear elevational view of the rims or arms of Fig. VII on an enlarged scale;

Fig. XXI is a cross-sectional view taken as on line XXI—XXI of Fig. XX and looking in the direction indicated by the arrows;

Fig. XXII is a cross-sectional view taken as on line XXII—XXII of Fig. XX and looking in the direction indicated by the arrows;

Fig. XXIII is a perspective view of the complete mounting of a modified form of the invention showing the gripping action of the pliers with the rim or arm portions;

Fig. XXIV is an enlarged fragmentary cross-sectional view taken as on line XXIV—XXIV of Fig. XXIII;

Fig. XXV is an enlarged fragmentary face view of the jaws of the pliers in gripping relation with the rim or arm;

Fig. XXVI is a cross-section of a modified form of lens rim or arm;

Fig. XXVII is a fragmentary perspective view of the lens rim or arm of Fig. XXIII with a portion thereof in cross-section;

Fig. XXVIII is a view generally similar to Fig. XXVI illustrating a further modification; and Fig. XXIX is a rear elevational view of a lens rim or arm related to a lens edge and on an enlarged scale.

In one form of these spectacles as shown in Fig. I the rim or arm is connected only at its nasal end. Its temple end is not supported but is free, hence, the rim or arm is in the form of a cantilever beam supported only at one end. In this construction there is great force exerted on the connection of the rim or bar at its connection to the central bridge structure, especially when the displacing force is applied at the temple side or free end of the rim or bar.

Because of this structural arrangement great difficulty has been experienced in providing rims or arms that will hold their alignment with the tops of the lenses. Because of the softness or pliability of the rims or arms, the rims or arms have been easily displaced from their alignment with the tops of the lenses and once displaced would not return to their aligned position. This defect was most annoying to the wearer as the displaced rims or arms came in contact with the forehead adjacent the eyebrows and interfered with and destroyed the fit of the spectacle or mounting on the face, and in some instances the hairs of the eyebrows were caught and held between the rims or arms and the lenses. In instances, too, the displaced rims or arms caused the displacement of the spectacle or mounting from the face to the extent it fell off and the lenses were broken.

This defect has done much to discourage the use of these spectacles and mountings.

From the standpoint of appearance it is almost universally held that this form of semi-rimless spectacle or ophthalmic mounting is the most beautiful that has yet been devised.

These defects in the rims or arms have been due to many causes, the softness of the metal, the shape and form of the rim or arm, and the tempering processes of working of the material—all of these have contributed.

The beauty of appearance of this form of spectacle or mounting lies primarily in the fact that there are no unsightly lens connections on the temple sides and that the rims or arms are practically invisible from the front.

It is therefore a prime object of the invention to maintain the desirable appearance of the spectacle and at the same time provide rims or arms that are free from these defects.

In the accomplishment of these objects there are the following basic considerations that have been taken into account and provided for:

The material of the rims or arms,

The shape and form of the rims or arms, and

The tempering and working processes by which the required results are obtained.

Another great difficulty that has arisen with these spectacle mountings, particularly with the type shown in Fig. VII, is that it is often necessary to bend parts of the supporting structure of the mounting to meet the fitting requirements of different individuals. These adjustments are made by the dispenser or fitter by grasping and holding the rim or arm with a pair of pliers and by bending adjacent parts such as the temple supports inwardly, outwardly, upwardly or downwardly as required by the wearer.

In practice it has been found that the pliers slip on the rim or arm during this bending operation and very often the lenses are broken or the edges flaked by the slipping pliers. Hence another important feature in this invention is the provision of means to prevent this slippage.

Referring to the drawings wherein like parts have been noted by similar reference characters:

In Fig. I, a pair of lenses 1 are held in spaced aligned position by a central bridge structure comprising lens straps 2, nose guard arms 3, nose guards 4, and the nose bridge 5. This central bridge structure may be made of separate pieces secured together or certain of the elements may be made integral with each other. The result is the same in both instances. The lens strap 2 may be made with two spaced lens engaging ears, one for each face of the lens, or with only a single ear engaging but one face of the lens. The lenses are secured to the straps by screws, soldered connections or other holding means.

The rims or arms 6 are secured to the central bridge structure on the nasal sides adjacent the lens straps 2. This connection may be as shown in Fig. V where the rim or arm 6 is soldered or united with the central bridge structure at the point of juncture of the lens strap 2 and the nose guard arm 3. This gives a very strong connection as the rim or arm is secured on two faces and is out of the way of interference with the guard and bridge adjustments. The rim or arm 6 may also, if desired, be connected only to the guard arm 3 with a space between it and the lens strap. The rim or arm 6 may also, if desired, be connected to the central bridge structure in other positions and in other ways.

The rim or arm 6 follows the top contour edges of the lenses from its connection on the nasal side to the central bridge structure to a point adjacent the temple side edges of the lenses where it terminates in temple connecting means.

The rim or arm 6, as shown in Fig. I, is behind the lenses on the facial side thereof. If desired the rims or arms may be on top of the lens edges. The rims or arms 6 follow closely the contour of the lenses. They may be made to rest against the lenses or they may be spaced a small distance therefrom as desired.

Temples 7 are pivotally secured to the rims or arms 6 at the temple joints 40, see Figs. II and III.

The bridge member 5 as shown in Figs. I and IV has a central arch portion for spanning the nose and side portions with adjusting loops as shown in Fig. IV. The side portions are united with the lens straps 2.

The rim or arm 6 may be attached at the lens connection 2 as shown in Fig. VI by being shaped over the strap 2 and soldered thereto at the juncture of the guard arm 3 and strap 2 as shown in Fig. V.

The essential feature of the construction shown in Fig. I is the rim or arm 6. The success of this type of construction is almost wholly dependent on the rims or arms 6. This is true as to their form and shape and also as to the material from which they are made and the processes by which they are worked to give them the required stiffness, flexibility, temper and freedom from deterioration from corrosion.

The rim or arm 6 is shown on an enlarged scale in Fig. XVII. In outline shape the rim or arm 6 is an arched or bowed bar-like member shaped to follow the contour shape of the lens edges from the point on the nasal sides where they are connected with the central bridge structure to a point adjacent the temple side portions of the lenses, adjacent the top of the lenses, from which point the rims or arms extend to their termination in temple connections at the temple pivots 40. It is essential to the successful operation of the spectacle that the rims or arms 6 retain their alignment with the lenses and are of such nature that they will return to aligned positions if displaced accidentally from the said aligned positions.

It will be noted that the rims or arms 6, as shown in Fig. XVII, have a portion extending upwardly from the connection at the lens straps 13, in substantially a vertical direction, to an arcuate or fillet-like section determined by the shape of the edge of the lenses on the nasal sides to the arcuate portion between the nasal sides of the lenses and the tops thereof, indicated by 14, and then a substantially horizontal arched portion descending slightly to the temple connections. In shape the rim or arm 6 comprises a portion of greater cross sectional dimension on the nasal side below the point 14. Between the said portion of greater cross sectional dimension and the top or substantially horizontal arched portion and adjacent the point 14 the rim or arm is tapered from the larger portion to the substantially horizontal portion which is of a smaller cross sectional dimension. The top or substantially horizontal arched portion is of a smaller cross sectional dimension than the said nasal side portion. So the said rim or arm in a direction from the nasal side outwardly comprises a thick portion N, a tapered portion S and a thinner portion T. The tapered portion S lies adjacent the point 14.

In Fig. XVIII is shown the cross section of the rim 6 on the line XVIII—XVIII of Fig. XVII and in Fig. XIX is shown the cross section of the rim 6 on the line XIX—XIX of Fig. XVII. It will be noted that the cross section at XVIII—XVIII is almost a full circle while that at XIX—XIX is oval in shape and much thinner than the section at XVIII—XVIII.

The wider portion N of the rim of Fig. XVII extends from the lens connection at 13 up to adjacent the point 14, the edges being substantially parallel in this section of the rim as shown.

From the end of the tapered portion S toward the temple side end of the rim or arm as indicated at T, the rim or arm is of a smaller cross sectional dimension and the sides are substantially parallel.

The shaping of the rim or arm as shown in Fig. XVII is for the purpose of substantially equalizing the bending or displacing tendency of the rim or arm throughout its length.

The rims or arms 6 have been shaped in this manner for the following reasons:

The rims or arms 6, being connected only on the nasal sides at one end in the type of mounting shown in Fig. 1, of course, permit tremendous leverage to a force applied at the free end of the rims or arms. This force is exerted at the connected ends of the rims or arms on the nasal sides. Hence, the force on the rims or arms are progressively greater from the temple side ends inwardly towards the nasal connections. It is thus important that these forces be equalized throughout substantially the length of the rims or arms and this is brought about by the shape of the rims or arms 6 as has been described. The rims or arms are of a greater cross sectional dimension where the greatest strains occur.

What is needed in the rim or arm is that in its length it will have sufficient stiffness and yet be capable of flexing without setting, and in its width or in a direction tranversely to its length a sufficient stiffness to prevent bending away from the line of the lenses. Referring to the cross sections of Figs. XVIII and XIX, it will be seen that the cross section transversely to the length of the rims is the greater, thus giving greater strength in this direction.

In other words the rim bars will flex up and down but are stiffer in a sidewise direction and hence more resistant to displacement in that direction.

The features described above relate to the form or shape of the rim bars. Another feature of these bars both of the type of Fig. XVII and Fig. XX lies in the material from which they are made. The principal features of the material are its stiffness, its flexibility, its temper and its resistance to corrosion. These all are of importance in the utility of the rims or arms to perform their required functions.

Ordinarily the metal parts of a spectacle or ophthalmic mounting of the type shown in Figs. I, VII and XIV are made of gold filled material or stock, although they can be made of other materials, either filled or of unfilled materials.

If gold filled or other filled material is used, the important feature as far as the rims or arms 6 are concerned is the material of the core around which the gold or other metal is laid.

The materials for the rim or arm 6 for the spectacle of Figs. I and XIV is a core of the following materials if filled material is used, or if unfilled material is used then of these materials alone:

1. A pure nickel, or
2. An alloy comprising, about 79.5 per cent nickel, about 13.0 per cent chromium and about 6.5 per cent iron.

Both of these materials will give good results for the purposes employed.

The full and practical realization of the required advantages from the use of these materials, however, is dependent on the processes by which the material is worked to bring about the required stiffness, flexibility and temper of the finished product.

If gold filled stock is to be used, a shell of gold 8 is filled with a core 9, Fig. XIII, of either of the materials set forth above. The shell is soldered on to the core.

The core filled shell is then reduced by rolling between rolls, with annealing as necessary during the rolling process. Where annealing takes place the stock is first annealed and then rolled cold. The rolling and subsequent annealing is carried out throughout the process.

There is an important step when getting near to required size. The last annealing should be done when the stock is at a size sufficiently large so that the following reduction in size is done by swaging or striking the stock. This produces the required stiffness.

This reduction and working must be done correctly for if it is not the product will be too soft.

The stock must be stiffened in the shape wanted, this is preferably done by swaging or striking while the stock is held in a confined die.

In the working or processing of the rims or arms, the bars are bent cold and reduced cold. The working is relied on for temper.

After the bar has been worked to the final shape and size of rim or arm, the rim or arm is locally annealed adjacent the temple connection or locally where further working is required.

In the drawing operations it is drawn at a temperature of about 1000 degrees Fahrenheit—i. e. the stock is heated to this temperature and then drawn. If the stock were not annealed it would be liable to break.

The greatest rquirement in the rim or arm is that of stiffness. The resistance to corrosion is another important factor. The two materials set forth are corrosion resistant.

The last operation of working must make the stock quite stiff and rigid—annealing the last time must be done at the proper size of stock so the subsequent working to desired size produces the maximum stiffness but leaves the material so it may be bent to desired shape.

The rims or arms 6 are soldered to the central bridge structure as described but care must be taken in this operation not to draw the temper up the rim or arm for it must remain rigid at the joint.

The temple connection is made after local annealing, as described, preferably by striking or swaging operations.

In this construction it is essential that the rim or arm will give before the connection to the central bridge structure.

This may be aided greatly by inserting a spring leaf or leaves between the edge of the lenses and the adjacent edge portion of the lens straps as shown in Fig. XII. This assists the rims or arms to return to aligned position with the edges of the lenses when accidentally displaced therefrom.

In this construction the temples and central bridge structure will flex in preference to the rim or arms, if not there would be the danger of breaking the lenses.

In the structure shown in Fig. VII, the general structure is similar to that of Fig. I except the rims 6 are secured to the lenses at 19 on the temple sides, by means of lens straps 20. The temple side lens straps 20 are carried by the rims 21 supported by the rims 6—see Fig. IX. The bridge 5 is of a slightly different structure from that of Fig. I as shown in Fig. VIII—otherwise the structures of Fig. I and Fig. VII are similar.

The central bridge structure shown in Figs. VII and VIII comprises the bridge 5 having the nose crest portion 30 with its thin section transverse to the plane of the lenses, descending side portions 31, having its thin section transverse to the thin section of the crest portion 30, the portions 31 are secured to the lens straps 2. The guard arm 3 and the guards 4 are supported also by the lens straps. The central bridge structure of Fig. VII may be made of separate members secured together or some of the members may be integral with others.

The rim bar 6 of this structure is shown in Fig. XX. In general form and shape the rim bar 6 is similar to that of Fig. XVII, in that it has a greater dimension in cross section on the nasal side, a smaller dimension in cross section in the substantially horizontal portion and a tapered section adjacent the point 14. The tapered portion however being nearer the temple side end than that of Fig. XVII.

Fig. XXI shows a cross section of the rim of Fig. XX taken on line XXI—XXI of said figure, and Fig. XXII shows the cross section as taken on line XXII—XXII of Fig. XX.

The rim 6 of Fig. XX is provided with a lens connection 20 on the temple side, carried by an arm 21 inset in and secured to the rim 6 as shown in Fig. XX.

It is clear that the rim bar of Fig. XX being connected at both ends, need not be so stiff as the rim bar of Fig. I, but on the other hand, as many of the strains present in the rims of Fig. I also have to be borne and transmitted by the rims of Fig. XX—their general form and shape are similar, only the taper is advanced a little way out towards the temple side end.

The material used for the rims of Fig. XX may be a nickel silver alloy, containing about 10 percent nickel silver, and the rest being copper and zinc or the said rims may be made of pure nickel, stainless steel or of a metal known commercially as Inconel. All of the above are provided with a suitable precious metal shell such as gold etc.

It is worked in a way similar to that of the rims of Fig. I and for the same purposes and results.

In Fig. XIV is shown a modified form of spectacle having the lenses 1 held in alignment by a straight bar bridge 60, extending from the rim 6 to rim 6 in a substantially horizontal direction adjacent the highest point of the lenses. In this construction the rim 6 follows the top contour edges of the lenses 1, substantially as in Fig. I. The rims 6 are connected on the nasal sides as shown in Fig. XV being secured at the union of the lens strap 2 and guard arm 3.

The bar bridge construction, if desired, may be used either with the type of spectacle of Fig. I of of the type of Fig. VII.

It is clear that if the bar bridge is used, that stiffness of the rims 6 is most important, for the alignment of the whole supporting structure is dependent on the rims holding their alignment with the lens edges. This is particularly so in spectacles of the type shown in Fig. I where the rims are supported only at one end.

The rims of Fig. XX are softer than those of Fig. I. The problems with the rims in this construction are not nearly as difficult as with those of the construction shown in Fig. I, yet the rims must be well made to carry the strains and to hold the necessary alignment, and resist corrosion.

In Fig. XI is shown how the rim 6 is bent out of the lens line for connection to the strap.

In Fig. XXVII is shown a cross section of a modified form of lens rim for use in either the construction of Figs. I-VII or XIV.

The rim, here, is made somewhat like a dumbbell in cross section, having the rounded side portions 41 and 42, and the central recessed portion 43. These recessed portions 43 are made in form to receive and hold the projections 44 on the jaws of a pair of adjustment pliers having the jaws 45 and 46 as shown in Fig. XXIV.

In other words the rim is made with a holding means portion to prevent slippage of the adjusting pliers. It is usual practice in fitting ophthalmic mountings to make the necessary adjustments by bending the parts with pliers. Usually the part is held in position by one pair of pliers and the bending done by another pair.

It is the general practice to adjust the rims 6 in the mountings shown in Figs. I, VII and XIV in this manner. Where the rim is rounded there is a tendency for the pliers to slip when pressure is exerted. There is occasional great danger of the pliers slipping and striking the lenses, either flaking or breaking them, for these adjustments are often made after the lenses have been mounted. Prescription lenses are expensive and this breakage is to be avoided as far as possible. This tendency of slipping pliers flaking or breaking the lenses is particularly troublesome in the mountings of Fig. VII.

The rims of Fig. XXVII not only provide the holding facilities for the pliers but the rims are of a very strong cross section, and have a pleasing design on their longitudinal faces. The material of the rims is the same as those above described for Figs. I, VII and XIV respectively and the working and tempering operations are the same and likewise the general longitudinal curvature.

The rims of Fig. XXVII are of great advantage as it overcomes a difficulty that has been experienced in the art. The plier point engaging section need not be the recess 43 as shown, any desired configuration that will prevent the pliers from slipping may be used. The form shown will produce the desired results.

The position of the tapered portion of the rim 6 is important in the matter of distributing the load of transmitted forces on the rim and particularly in preventing the bending or displacement of the rim from the lens edge adjacent the portion of the rim where there is the arcuate fillet between the substantially vertical and horizontal portions of the rim on the nasal side portion of the rim adjacent the top of the lens.

In Fig. XVII the edge of the lens 1 is indicated by the dot and dash line 50. The vertical center line of the lens is indicated by the dot and dash line 51. The dot and dash line 52 indicates the end of the tapered portion of the rim nearest the center line 51. This line 52 is substantially one half the distance from the center line 51 to the lens edge 50 on the nasal side of the lens. The tapered portion of the rim 6 is located adjacent the arcuate fillet between the substantially vertical and horizontal portions of the rim.

In Fig. XX the vertical center line of the lens is indicated by the line 51, the edges of the lens by 50. In the rim of this construction the end of the tapered portion of the rim nearest the center line 51 is substantially one third the distance between the center line 51 and the lens edge 50 in the nasal side of the lens. This is shown by the lines 55 and 56 which trisect the distance from the center line 51 to the lens edge on the nasal side.

In Figs. XVII and XX the dot and dash line 54 is a horizontal line thru the lens connection.

It is clear that the nearer the heavier portion of the rim 6 is advanced towards the center line of the lens the greater will be the resistance of the rim to bending out of line in the fillet portion of the rim. The heavier portion of the rim should be carried well up into the fillet portion for maximum efficiency and resistance to displacement.

In Figs. XXVI and XXVIII are shown modifications of the rim of Fig. XXVII. In Fig. XXVI the recess 43 for the pliers is shown only on the upper side, instead of on both sides as in Fig. XXVII. It is clear that many modifications of the plier engaging surface can be made to insure a grip of the pliers on the rims.

In Figure XXIX is shown the relationship of the rims 6 with the edges of the lenses 1. The rim bar 6 extends upwardly from its connection to the lens strap or connection 2 at 13. Above the connection to the lens strap 2 on the nasal side and intermediate the vertical center line 51 of the lens there is an arcuate portion X having its center of curvature at O. The section or portion X blends into another arcuate portion B having its center of curvature at T, and this arcuate portion blends with yet another arcuate portion C having its center of curvature at P. Preceding towards the temple side the portion C blends with another arcuate portion Y having its center of curvature at V and the portion Y in turn blends with another arcuate portion or fillet D having its center of curvature at M. The portion D also blends with the temple side edge of the lens 50.

The portion X is larger in cross section than the rest of the rim 6, and between the portions X and B there is a tapered portion, indicated at the cross sectioned portion S for the rims of type shown in Fig. XVII and as shown in dotted cross section at R for the type of rim shown in Fig. XX. This taper is on the lower or under side of the rim, the outer or upper side of the rim at the tapered portion follows the contour line of the lens edge.

The tapered portion S of the rim of Fig. XVII is located substantially in the portion B of the rim adjacent the juncture of the portions X and B. A portion of the tapered portion may extend into the portion X substantially as shown.

The tapered portion R of the rim of Fig. XX is located in the portion B intermediate the vertical center line 51 of the lens and the juncture of the portions X and B substantially as shown.

From the portion D in a direction towards the temple side, the rim turns outwardly and rearwardly to the temple connection.

The rim 6 is wider in a direction transverse to the plane of the lenses, than it is in the plane of the lenses, hence it is stiffer in this direction and more resistant to displacement from alignment with the edge of the lenses.

The portion of the rim between the tapered portion and the nasal end is stiffer than the portion on the temple side of the taper. The taper is located and is of such dimensions as to provide maximum resistance to displacement from the lens edge upwardly and downwardly in such a way as to equalize the bending strains in the rim in this direction. The taper is located substantially at the place where this bending strain will be greatest.

In ophthalmic mountings of the type described the mounting comprises broadly a central bridge structure, rim and temples. In the art the central bridge structure comprises the bridge, the lens holding members or straps, the guard arm and the nose guard. This is considered a unit in the art where it is given the name of "center."

The central bridge structure and the rims constitute the lens holding means and the assembly is termed a "front" in the art.

From the foregoing it will be seen that there have been provided simple, efficient and economical means for obtaining all the purposes and advantages of the invention whereby important improvements have been made over the prior art.

Having described the invention, I claim:

1. An ophthalmic mounting comprising means for holding lenses in spaced aligned position before the eyes, said means comprising a central bridge portion, lens rims and temples for holding the mounting in place on the face, said lens rims comprising rim members following the upper contour edges of the lenses and associated with the central bridge portion on the nasal sides and terminating in temple connections adjacent the upper temporal sides of the lenses embodying a relatively thick nasal portion, an upper portion and said rims embodying a substantially vertically disposed nasal portion of uniform cross-sectional thickness which terminates adjacent its upper part in an arcuate-shaped fillet-like section blending with a horizontally arched portion of oval cross-section and having a longitudinally extending groove in the upper and lower side portions thereof providing a dumb-bell shape in section to said horizontal portion of the rims.

2. An opthalmic mounting comprising means for holding lenses in spaced aligned position before the eyes, said means comprising a central bridge portion, lens rims and temples for holding the mounting in place on the face, said lens rims comprising rim members following the upper contour edges of the lenses and associated with the central bridge portion on the nasal sides and terminating in temple connections adjacent the upper temporal sides of the lenses and said rims embodying a substantially vertically disposed nasal portion of uniform cross-sectional thickness which terminates adjacent its upper part in an arcuate-shaped fillet-like section blending with a horizontally arched portion of oval cross-section and having a longitudinal groove in a side surface thereof.

3. A lens supporting structure for use with a pair of lenses in an ophthalmic mounting, said supporting structure comprising a bridge, lens connection means, and temple supporting arms on opposed sides thereof to follow the general upper contour of said lenses when assembled therewith, said temple supporting arms having a nasal portion extending in a substantially vertical direction and of circular cross-section and uniform thickness throughout its length, said nasal portion having an arcuate fillet-like section adjacent its upper part, and said arms continuing as a substantially horizontally arched portion descending slightly and to temple connection means, said horizontally arched portion being of oval cross-section and said arcuate fillet-like section being tapered to provide a merging of the circular cross-section of the nasal portion with the over cross-section of the horizontally arched portion, said horizontally arched portion in a horizontal direction being equal in thickness to substantially the thickness of said nasal portion of the temple supporting arm, and in a vertical direction, being substantially thinner whereby flexing of said temple supporting arm in vertical directions may be confined to the horizontally arched portion and with said arm being substantially resistant to lateral displacement along its entire length.

4. An ophthalmic mounting comprising a pair of lenses, a central bridge intermediate said lenses, connection means for securing the lenses adjacent the bridge, and temple supporting arms on opposed sides of said bridge following the general upper contour of said lenses, said temple supporting arms having a nasal portion extending from said bridge in a substantially vertical direction to an arcuate fillet-like section, said nasal portion being of circular cross-section and uniform thickness throughout its length, with said circular cross-section and uniform thickness extending into said arcuate fillet-like section, and said arms continuing as a substantially horizontally arched portion descending slightly and terminating in temple connection means, said horizontally arched portion being of oval cross-section and in one plane being equal in thickness to substantially the thickness of said nasal portion of the temple supporting arm, and in a plane normal thereto, being substantially thinner, and an intermediate tapered portion merging the circular cross-sectional shape of said nasal portion with the oval cross-sectional shape of the horizontally arched portion, said tapered intermediate portion being located intermediate a vertical line drawn through the axis of said lenses and the nasal ends of said arms and substantially adjacent said arcuate fillet-like section thereof.

5. A lens supporting structure for use with a pair of lenses in an ophthalmic mounting, said supporting structure comprising a bridge, and temple supporting arms on opposed sides thereof to follow the general upper contour of said lenses when assembled therewith, said temple supporting arms embodying a nasal portion extending in a substantially vertical direction and of circular cross-section and uniform thickness throughout its length, said nasal portion having an arcuate fillet-like section adjacent its upper part, a second arcuate portion blended with said fillet-like section and extending toward the temporal end having a radius longer than the radius of said fillet-like section, and a third arcuate portion blended with the second arcuate portion, said third arcuate portion having a radius longer than the second arcuate portion and terminating in temple hinge means, said second and third arcuate portions being of oval cross-section and said fillet-like section being tapered to provide a merging of the circular cross-section of the nasal portion with said oval cross-section of the second and third arcuate portions, said second and third arcuate portions in a horizontal direction being equal in thickness to substantially the thickness of said nasal portion of the temple supporting arm, and in a vertical direction, being substantially thinner whereby flexing of said temple supporting arm in vertical directions may be confined to said second and third arcuate portions and with said arm being substantially resistant to lateral displacement along its entire length.

6. A lens supporting structure for use with a pair of lenses in an ophthalmic mounting, said supporting structure comprising a bridge, lens connection means, and temple supporting arms on opposed sides thereof to follow the general upper contour of said lenses when assembled therewith, said temple supporting arms having a nasal portion extending in a substantially vertical direction and of circular cross-section and uniform thickness throughout its length and into an arcuate fillet-like section adjacent its upper part, said arms continuing as a substantially horizontally arched portion descending slightly and to temple connection means, said horizontally arched portions being grooved in the direction of its length and of general oval shape in cross-section and said fillet-like section being tapered to provide a merging of the circular cross-section of the nasal portion with the oval cross-section of the horizontally arched portion, said horizontally arched portion in a horizontal direction being equal in thickness to substantially the thickness of said nasal portion of the temple supporting arm, and in a vertical direction, being substantially thinner whereby flexing of said temple supporting arm in vertical directions may be confined to the horizontally arched portion and with said arm being substantially resistant to lateral displacement along its entire length.

EDWARD M. SPLAINE.

REFERENCES CITED

The following references are of record in the file of this patent:

UNITED STATES PATENTS

| Number | Name | Date |
| --- | --- | --- |
| 2,123,385 | Smith | July 12, 1938 |
| 2,188,380 | Uhlemann | Jan. 30, 1940 |
| 2,222,372 | Puppe | Nov. 19, 1940 |
| 2,301,325 | Reiss et al. | Nov. 10, 1942 |
| 2,301,445 | Ostertag et al. | Dec. 29, 1942 |
| 2,306,792 | Moore | Dec. 29, 1942 |
| 2,357,267 | Rohrbach | Aug. 29, 1944 |
| 2,388,191 | Splaine | Oct. 30, 1945 |